April 23, 1935. D. F. WHITING 1,998,476
METHOD FOR MAINTAINING CONSTANT PLATE CURRENT IN AN AMPLIFIER
Filed Aug. 12, 1929
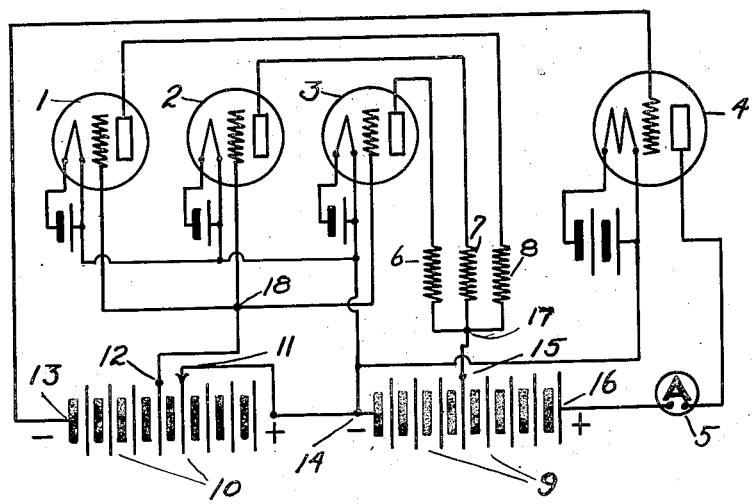
INVENTOR.
Donald F. Whiting
WITNESS
F. F. DeBoalt
BY
Denison & Thompson
ATTORNEYS.

Patented Apr. 23, 1935

1,998,476

UNITED STATES PATENT OFFICE 1,998,476

METHOD FOR MAINTAINING CONSTANT PLATE CURRENT IN AN AMPLIFIER

Donald Fairfax Whiting, Port Washington, N. Y., assignor, by mesne assignments, to Movietonews, Inc., New York, N. Y., a corporation of New York Application August 12, 1929, Serial No. 385,448

4 Claims. (Cl. 179—171)

This invention relates to a new and useful method for maintaining constant plate current in the last stage of a multi-stage vacuum tube amplifier. More particularly, this invention relates to the control of plate current in the last stage of an amplifier used in portable sound moving picture recording apparatus. It can, however, generally be applied to any multi-stage amplifier or other vacuum tube operated apparatus.

Portable recording amplifiers for talking moving pictures have their plate circuits energized from B batteries. Previous to this time plate potentials were maintained at practically uniform value by adjusting the positive terminal to the nearest 22½ volt tap. This method has many disadvantages. First an additional number of batteries were required so that as the battery potential decreased, the decrease could be compensated for by changing to a higher voltage tap. In this type of plate current control the grid potential was fixed, operating at a value most effective for normal plate potential. The normal plate potential was not always obtained as the B batteries available did not have voltage taps smaller than 22½ volts. Should the plate potential be in excess of normal, an abnormal electron emission resulted, producing a distortion and shortening the life of the tube. A plate potential below normal also caused distortion. It is therefore desirable to maintain the plate currents of the tubes in an amplifier at their normal values.

It is an object of my invention to provide a new method for maintaining substantially normal plate currents in the tubes of an amplifier. This can be accomplished by varying the grid potential instead of the usual plate potential. The grid potential battery can be supplied with a large number of voltage taps whereby small changes in voltage can be made.

It is a further object of my invention to provide for better B battery economy in the operation of the plate circuits of the amplifier. By using a grid method of control in maintaining normal plate current an original saving of 20% in B battery installation is effected. This is made possible since no extra batteries are required to replace the drop in potential due to use as was customary in the old method of plate current control. A further saving is effected due to the longer life of the B battery since the grid potential method of control will keep the current output of the battery at a normal value.

Another advantage of this type of control is realized as it lends itself useful in reducing the space required for the recording apparatus. In all portable field sound recording apparatus, the space required is an important consideration. By eliminating the number of B batteries formerly required, a saving in space is effected.

Space for the B batteries is also saved by eliminating the necessity of providing ready access to the batteries, as would be the case were it necessary to adjust the voltage taps on the battery at frequent intervals. In the latter case, it has been found necessary to provide space above the box containing the batteries for the removal of the battery box cover and access to the battery terminals. It is an object of this invention to eliminate this considerable waste of space by making whatever frequent adjustments may be necessary at the amplifier itself, thereby permitting the B batteries to be stowed away compactly in an out-of-the-way place.

Another object of the invention is to maintain the impedances of the vacuum tubes at normal and uniform values as the plate battery deteriorates. By maintaining the plate currents at their normal values, the impedances of the tubes tend to remain normal which results in the maintenance of a constant amplification and a uniform amplification characteristic at various frequencies.

Further objects and advantages will be apparent with reference to the accompanying drawing which shows how the grid potential method of control is applicable to a multi-stage amplifier. Coupling means between stages have been omitted and only battery circuits involving the filament grid and plate of the tube are shown. Tubes 1, 2 and 3 are amplifiers of power lower than the power of the tube 4 in the last stage and therefore require a lower plate potential. The plate circuits of tubes 1, 2 and 3 are connected to resistances 8, 7 and 6 respectively and joined at 17. Connection to the B battery 9 from connection 17 is made at 15. The plate circuit of tube 4 is connected in series with milli-ammeter 5 and connected to battery 9 at 16.

The grids of tubes 1, 2 and 3 are joined at 18 and connection to the grid of tube 4 is made at 13. A clip 11 connects the positive side of the grid battery 10 to the negative side of the B battery 9 at 14. All positive filament connections are made to contact at 14 thereby completing the circuit.

Starting with the assumption that battery 9 is new and of the proper voltage, the clip 11 is moved along the positive side of battery 10 until the proper grid bias is obtained on the last amplifier tube 4. When milli-ammeter 5 indicates normay plate current the condition for normal grid voltage must also be satisfied.

As the potential of battery 9 falls off due to use of the amplifier the plate current will also decrease. Then in order to bring the plate current to normal the clip 11 will have to be shifted along towards the negative side of battery 10, decreasing the grid potential.

This method of controlling the plate current in the last stage of an amplifier may also be made use of in compensating for the effects of deterioration of the plate batteries for the preceding stages as such deterioration affects these stages. This compensation may be made to occur simultaneously with the compensating adjustment made for the last stage if the plate batteries supplying the preceding stages may be assumed to deteriorate at the same rate and simultaneously with the deterioration of the batteries used for the plate of the last stage and if the amplification constant of the tubes used in the preliminary stages is equal to or less than the amplification constant of the tube used in the final stage.

The first condition practically obtains almost always when the preceding stages of a power amplifier are operated from the same plate battery that supplies the last stage, for the total plate current consumed by the preceding stages is usually small with respect to the current drawn by the final stage rendering the rate of deterioration practically uniform even when the current to the earlier stages is drawn from only part of the battery. It also often occurs that the entire plate battery is utilized for other purposes, which use tends to make the rate of deterioration independent of the current drawn by the preliminary stages.

The second condition can be met by making use of the proper selection of tubes. The following description of operation supplemented by the accompanying drawing will explain how this concurrent compensation may be accomplished.

It is desired to compensate for the uniform deterioration of the cells composing plate battery 9 by the adjustment of a single contact 11 along grid biasing battery 10. It is understood that the compensation effected should be of such a nature that the plate currents of all vacuum tubes shall remain practically constant. It may be observed from the drawing that the connections from the grid battery 10 at point 12 through junction 18 to the grids of vacuum tubes 1, 2 and 3 of the preliminary stages and from battery 10 at point 13 to the grid of tube 4 composing the final stage are such that when contact 11 is adjusted along battery 10 the same potential is added or subtracted from the grid circuits of the preliminary and final stages. Consequently, in order that the plate currents of the tubes may remain constant, corresponding changes must be made in the plate voltages applied to the tubes in such a direction that when the grid bias applied to the tubes is made more negative the plate potential is made more positive and vice versa.

It is obvious that the ratio between the values by which the plate potential must be changed to compensate for any change of grid bias is the factor denoted as the amplification constant of the tube or tubes. Consequently, if the amplification constant of all the tubes is the same, point 15 should be moved along battery 9 to coincide with point 16, so that the same change of plate potential due to the deterioration of the B battery may be compensated by the same change in the grid bias.

If, however, the amplification constant of some of the tubes is less than the amplification constant of others, as is assumed to be the case in the accompanying drawing in which tubes 1, 2 and 3 are assumed to have a lower amplification constant than tube 4, point 15 should be located at such a position along battery 9 so that the potential change at that point due to B battery deterioration will be related to the corresponding potential change at point 16 directly as the amplification constant of tubes 1, 2 and 3 is related to the amplification constant of tube 4.

If tubes 1, 2 and 3 draw plate currents which are small with respect to the plate current of tube 4 or other load upon the battery, the position of points 15 and 16 along the battery should be chosen in a ratio directly proportional to the amplification constants of the tubes which they serve.

If tubes 1, 2 and 3 draw plate currents which are appreciable with respect to the remaining load upon the battery, some correction for this effect may be secured by locating point 15 in a position slightly different from that indicated above.

Since it frequently occurs that the potential obtained by making the attachment 15 to the battery at the point selected in the manner indicated above is greatly in excess of the potential which it is desired to apply to the plates of tubes 1, 2 and 3, this potential may be reduced any desired amount by the inclusion of resistances 6, 7 and 8 between the point of attachment 15 to the B battery 9 and the plate of the respective tubes, numbers 1, 2 and 3.

Since the plate currents of tubes 1, 2 and 3 are maintained at a constant value as battery 9 deteriorates by an adjustment of the grid bias by means of contact 11 along battery 10, the potential drop through resistances 6, 7 and 8 will remain constant and the presence of the resistances will have no effect upon the compensation secured for variations in the potential of battery 9 as explained in the preceding paragraph.

Point 12 should be selected along battery 10 at the point to give the grid potential to tubes 1, 2 and 3 best suited to the plate potential actually impressed upon the plates of these tubes.

Similar compensating means may be made use of in case a generator or a rectifier is used for supplying the potentials in place of the batteries shown in the accompanying drawing. In this case, adjustment of the potentials may be secured by potentiometers connected across the generator or the rectifier terminals in any of the ways now well known in the art.

Consequently the appended claims are intended to cover any cases in which the substitution of a generator or rectifier or other direct current source or sources with or without potentiometers is made for the batteries shown upon the drawing and mentioned in the claims.

Having described a specific method for controlling the plate current in a multi-stage amplifier, I do not wish to be restricted to the use of the particular apparatus heretofore mentioned for the purpose of illustration, as many changes and modifications can be made within the scope of the appended claims.

I claim:

1. In a multistage amplifier having a plurality of tubes possessing different characteristics, a common source of plate potential having a plurality of voltage taps, connections from the plate circuits of said tubes to the taps on said plate potential source, a common source of grid potential having a plurality of voltage taps, fixed connections from the grid circuits of said tubes to said grid potential taps, and single control means for varying the grid potential to all tubes for automatically compensating for variation of potential in the plate potential source.

2. In a multistage amplifier having a plurality of tubes possessing different characteristics, a common source of plate potential for energizing the plate circuits of said tubes, a common source of grid potential having a plurality of voltage taps, connections from the grid circuits of said tubes to said grid potential source, and a step-by-step single control for varying the grid potential simultaneously on all tubes whereby the plate impedances of all tubes are maintained substantially constant as the plate potential source varies.

3. In a multi-stage amplifier having a plurality of tubes having different characteristics, means for energizing the plate circuits of said tubes in accordance with their characteristics including a source of potential, a portion of which being common to all tubes, means for connecting the grid circuits of said tubes to a source of grid potential in accordance with their characteristics, said grid potential source having a portion common to all of said grid circuits, and single control means operable at will for varying the grid potential to all tubes for automatically compensating for variation of potential in the plate potential source.

4. In a multi-stage amplifier having a plurality of tubes having different characteristics, means for energizing the plate circuits of said tubes in accordance with their characteristics including a source of potential, a portion of which being common to all tubes, means for connecting the grid circuits of said tubes to a source of grid potential in accordance with their characteristics, said grid potential source having a portion common to all of said grid circuits, and a tapped connection changeable at will from said common grid potential portion to said plate potential source for automatically compensating for variation of potential in the plate potential source.

DONALD FAIRFAX WHITING.